United States Patent
Tanaka et al.

[11] Patent Number: 5,959,734
[45] Date of Patent: Sep. 28, 1999

[54] DISTANCE MEASURING DEVICE

[75] Inventors: Shoichi Tanaka; Yukio Fukushima; Masahira Akasu, all of Tokyo, Japan

[73] Assignee: Mitsubishi Denki Kabushiki Kaisha, Tokyo, Japan

[21] Appl. No.: 09/070,792

[22] Filed: May 1, 1998

[30] Foreign Application Priority Data

Nov. 26, 1997 [JP] Japan ................................. 9-324501

[51] Int. Cl.⁶ ...................... G01B 11/14; G01B 11/00; G01B 11/24
[52] U.S. Cl. ...................... 356/375; 356/372; 356/374; 356/376
[58] Field of Search ...................... 356/375, 372, 356/374, 373, 382, 387, 355, 356, 376

[56] References Cited

U.S. PATENT DOCUMENTS

| 5,461,478 | 10/1995 | Sakakibara et al. | 356/375 |
| 5,847,833 | 12/1998 | Yokoyama et al. | 356/375 |

FOREIGN PATENT DOCUMENTS

| 3-95979 | 9/1991 | Japan . |
| 6-137867 | 5/1994 | Japan . |

Primary Examiner—Frank G. Font
Assistant Examiner—Roy M. Punnoose
Attorney, Agent, or Firm—Sughrue, Mion, Zinn, Macpeak & Seas, PLLC

[57] ABSTRACT

A distance measuring device having an improved control performance in a compact body by simplifying a structure for scanning a laser beam and a method of controlling the scanning. The device has a mirror for scanning an emitted laser beam, an axis around which the mirror is swung, a permanent magnet which swings along with the mirror, a core disposed opposite to the permanent magnet, a coil provided in the periphery of the core, a Hall element for detecting a swing angle of the mirror, and a circuit for controlling swing motion with a signal derived from a swing waveform formed in a predetermined shape in order to control a current in the coil, and a control signal formed by a controlled variable calculated from a deviation between a predetermined position of the mirror and a detected position.

20 Claims, 4 Drawing Sheets

DISTANCE MEASURING DEVICE

BACKGROUND OF THE INVENTION

1. Field of the Invention

The present invention relates to a distance measuring device which emits a laser beam with scanning, receives a light reflected by an object, and detects a distance from the object.

2. Discussion of Background

There have been various proposals for a conventional device for measuring a distance from an object by emitting a laser beam and scanning by a predetermined angle. For example, a conventional device is disclosed in Japanese Unexamined Utility Model Publication No. Hei3-95979 (JP-U-3-5979), and a schematic view of a mechanism for swinging a mirror is shown in FIG. 6. In FIG. 6, numeral 4 designates a mirror for reflecting a laser beam, which is provided on a revolving shaft 5. Numeral 40 designates a permanent magnet having a north pole and a south pole, which are disposed of the circumference of a movable coil 42 wound around a core 41. Numerals 43a and 43b are spiral springs which urge opposing turning effects to each other, wherein one ends of the spiral springs are fixed to vicinities of both ends of the core 41 and the other ends are connected to a driving circuit 44. When an electric current is applied from the driving circuit 44 in the direction of an arrow 45, the mirror is swung in the clockwise direction, and when the current is applied in the reverse direction, the mirror is swung in the counterclockwise direction. It is constructed such that the laser beam can be scanned by this rotation of the mirror. In order to vary a swing angle of the mirror 4 in response to a vehicle speed, the driving circuit 44 applies the current to the movable coil 42.

However, the conventional device has problems that the size of the device was structurally large and miniaturization of the device was difficult because a system of rotating the coil portion by applying electricity thereto while fixing the permanent magnet was used when the mirror was swung; and an accuracy of scanning was not sufficient because an open control was adopted.

The structure of conventional device disclosed in Japanese Unexamined Patent Publication No. Hei6-137867 (JP-A-6-137867) is shown in FIG. 7. In FIG. 7, numeral 1 designates an element for emitting laser beam; and numeral 2 designates a collimating lens for changing the laser beam to a parallel beam. Numeral 3 designates a fixed mirror for reflecting the laser beam by a predetermined angle. Numeral 11 designates a lens for receiving light; and numeral 12 designates an element for receiving light. Numeral 4 designates a swingable mirror for scanning driven by a motor 46. Numerals 47 through 49 constitute a means for detecting a swing angle of the swingable mirror 4, wherein numeral 47 designates a laser diode and numeral 48 designates a condenser. The laser beam emitted from the laser diode 47 is reflected by the backside of the mirror 4 having structure of double-sided mirror. Numeral 49 designates a position sensitive device (hereinbelow referred to as PSD) which detects the position by converting the reflected laser beam to an analog signal.

In this conventional device, the laser beam of the laser beam emitting element 1 was reflected by the fixed mirror and further reflected by the swingable mirror 4 in order to emit to the outside. Meanwhile, the laser beam from the laser diode for detecting scanning position 47 was simultaneously emitted and reflected by the mirror 4 to enter PSD. A feedback control of the motor 46 was performed using such information of position. However, it was necessary to control a deviation of scanning position as well as a deviation of scanning rate to be substantially 0. Therefore, the conventional apparatus has problems that the light emitting element for detecting position, PSD, the lens for condensing the laser beam, the control circuit for controlling these components, high resolution power in these components and so on were necessary; a predetermined area between the swingable mirror 4 and these components was necessary; the cost was high; miniaturization was difficult; and further a method of controlling was complicated, because a controlled variable of feedback control should include two terms of deviation of the scanning position and of the scanning rate.

Thus, in the conventional devices, there were the problems that the mechanism for swinging and the controllability of swinging were complicated as mentioned above.

SUMMARY OF THE INVENTION

It is an object of the present invention to solve the above-mentioned problems inherent in the prior art and to provide a device having a swinging mechanism of simple structure using a simple controlling method of swinging mirror to obtain an improved controlling performance, and a compact body.

Another object of the present invention is to provide a controlling device which is not influenced by a change of temperature.

Another object of the present invention is to provide a device which does not generate hunting by smoothing swing motion for scanning.

Another object of the present invention is to stabilize swing motion within a short time.

According to a first aspect of the present invention, there is provided a distance measuring device comprising: a beam emitter 18 for emitting a laser beam, a scanning portion 19 for scanning the laser beam by swinging a mirror for a predetermined range, a light receptor 20 for receiving the beam reflected by an object, and a means 17 for calculating a distance from the object based on a propagation delay time between a time of emitting beam and a time of receiving light, wherein said scanning portion 19 comprises a swingable mirror 4, a permanent magnet 6 swingable along with the swingable mirror 4, an electromagnetic coil 8 disposed oppositely to the permanent magnet, a means for detecting swing position 10, 21 which detects a swing angle of said swingable mirror, and a means for controlling swing motion 16 which controls said electromagnetic coil so that a detected swing position becomes a predetermined position, and the means for controlling swing motion is constructed such that said electromagnetic coil is controlled by a signal for controlling swing motion determined by a swing signal 24 formed in a predetermined waveform and a control signal formed by a controlled variable operated from a deviation between said predetermined position of the swingable mirror and the detected swing position.

According to a second aspect of the present invention, there is provided a distance measuring device according to the first aspect of the invention, further comprising: a means for detecting temperature provided in the vicinity of the scanning portion, and a means for correcting temperature which is integrated into the means for controlling swing motion and corrects the controlled variable depending on the detected temperature.

According to a third aspect of the present invention, there is provided a distance measuring device according to the first or the second aspect of the invention, wherein the swing signal 24 in the means for controlling swing motion 16 has a waveform including a linear portion A at least while the distance is measured.

According to a fourth aspect of the present invention, there is provided a distance measuring device according to one of the first through the third aspects of the invention, wherein a point of changing a direction of swing motion and the vicinity thereof are a gentle curve in a waveform formed by the swing signal 24.

According to a fifth aspect of the present invention, there is provided a distance measuring device according to one of the first through the fourth aspects of the invention, wherein the signal for controlling swing motion, which controls the electromagnetic coil when a swing control is started in the means for controlling swing motion, is formed to gradually approach a predetermined signal for controlling swing.

According to a sixth aspect of the present invention, there is provided a distance measuring device according to one of the first through the fifth aspects of the invention, wherein the means for controlling swing motion is controlled irrespective of the detected swing position of the means for detecting swing position at the beginning of swing control and returned to a predetermined control using the detection of swing position after the control is stabilized.

According to a seventh aspect of the present invention, there is provided a distance measuring device according to one of the first through the sixth aspects of the invention, wherein the means for controlling swing motion has a means for memorizing controlled variable which memorizes a controlled variable during a stable swing control, and the swing motion is started using this memorized controlled variable as an initial value when the swing motion is started again.

BRIEF DESCRIPTION OF THE DRAWINGS

A more complete appreciation of the invention and many of the attendant advantages thereof will be readily obtained as the same becomes better understood by reference to the following detail description when considered in connection with the accompanying drawings, wherein.

DETAILED DESCRIPTION OF THE PREFERRED EMBODIMENTS

A detailed explanation will be given of preferred embodiments of the present invention in reference to FIGS. 1 through 5 as follows, wherein the same numerical references are used for the same or the similar portions and description of these portions is omitted.

EXAMPLE 1

Figure 1:
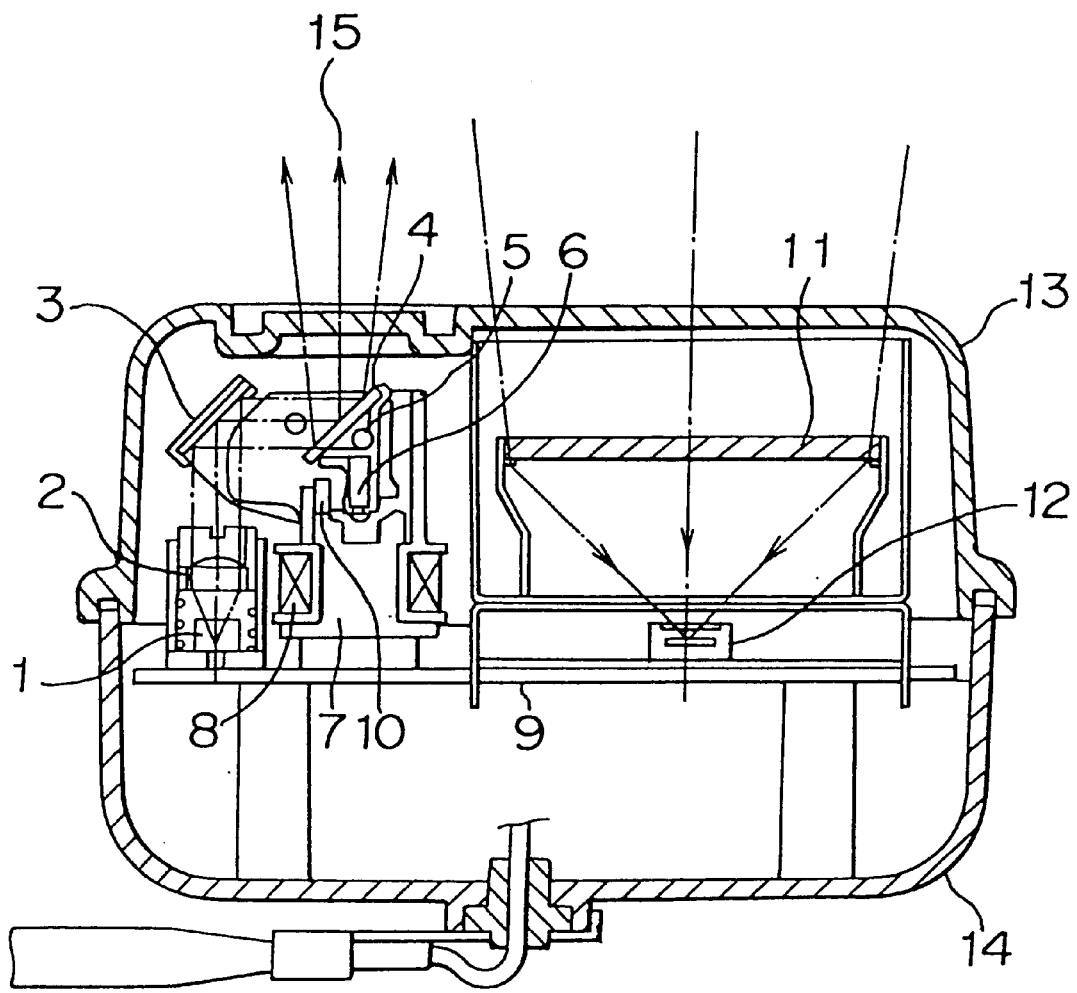
FIG. 1 is a schematical view for showing the whole structure of distance measuring device according to Example 1 of the present invention.

FIG. 1 shows the whole structure of a distance measuring device according to Example 1 of the present invention. In FIG. 1, numeral 1 designates a light emitting element for emitting a laser beam; and numeral 2 designates a collimator lens for changing the emitted laser beam to a parallel beam. Numeral 3 designates a first mirror for reflecting the laser beam at a predetermined angle. Numeral 4 designates a second mirror for introducing the reflected laser beam to the outside, wherein the laser beam is irradiated like arrows 15. The laser beam reflected by an object (not shown) in the forward space passes through a light receiving lens 11 and converges therein so as to be inputted into an element for receiving light 12. A means for calculating the distance from the object based on a propagation delay time between a time of emitting beam and a time of receiving light is provided in a substrate 9 and not shown in FIG. 1. Numeral 5 designates a shaft for oscillating the second mirror 4 to scan the laser beam. Numeral 6 designates a permanent magnet oriented in the thickness direction and disposed in the vicinity of the shaft 5, which can also be swingable around the shaft of swinging 5. Numeral 7 designates, for example, a steel core, which is disposed with a predetermined gap from the swingable permanent magnet 6. A coil 8 is provided in the periphery of the core 7. The core 7 and the coil 8 compose the electromagnetic coil. A means for controlling swing, which can apply an electric current to the coil 8 in both directions of positive and negative, is provided in the substrate 9 and not shown. Numeral 10 designates a means for detecting a swing position of the second mirror 4. The above-mentioned components and the above-mentioned means are enclosed in a housing composed of a front cover 13 and a rear cover 14. Furthermore, when the light emitting element 1 is disposed in the position of the first mirror 3, the first mirror 3 becomes unnecessary.

Figure 2:
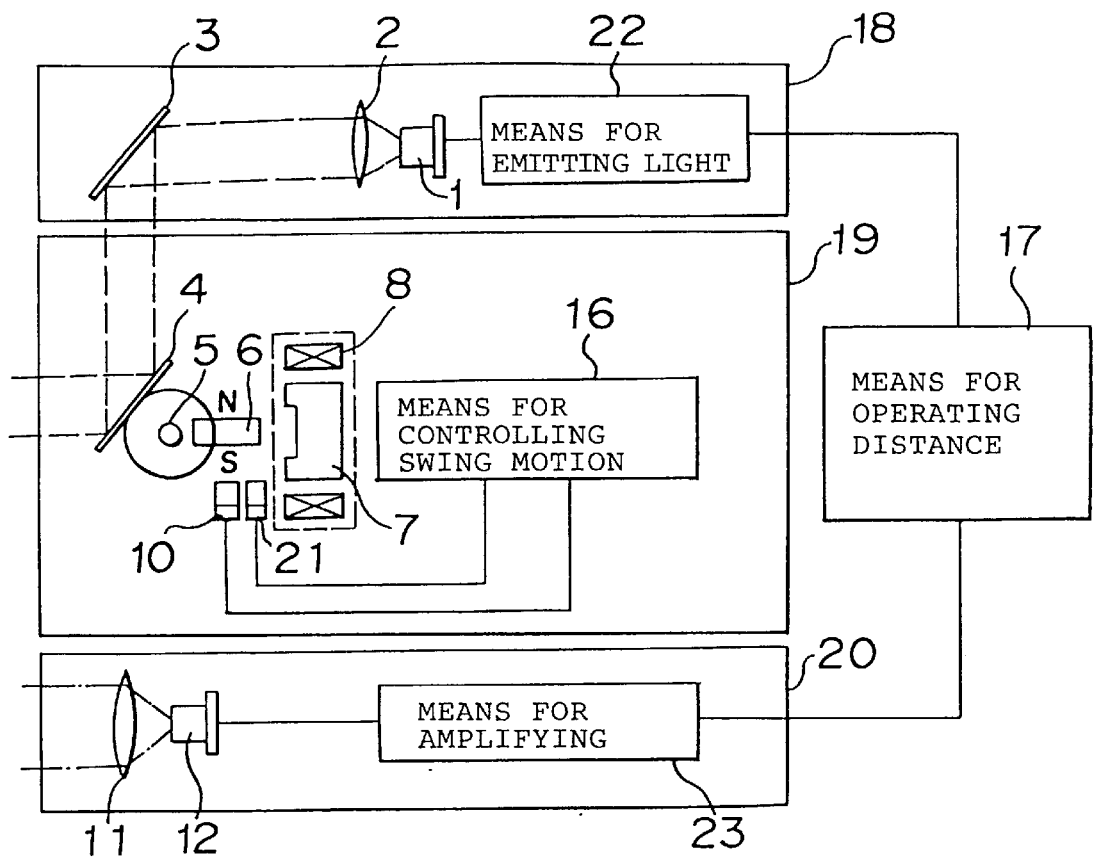
FIG. 2 is a block chart for showing the function of distance measuring device according to Examples 1 and 2.

The function of measuring distance according to the present invention is described with reference to a block chart of FIG. 2. In this Example, a beam emitter 18 for emitting a laser beam a scanning portion 19 for swinging the second mirror 4, a beam receptor 20 for receiving the laser beam reflected by the object, and a means for operating distance 17 for calculating a distance from the object and the position thereof are used.

The beam emitter 18 comprises a light emitting element 1, a means for emitting light 22 for driving the light emitting element, a collimator lens 2 and a first mirror 3, wherein the means for emitting light 22 emits a light under the direction of the means for calculating distance 17.

The scanning portion 19 comprises the second mirror 4, a permanent magnet 6, a core 7 provided with a coil 8 in the periphery thereof, an element for detecting swing position 10, and a means for controlling swing 16, wherein the position of the second mirror detected by the element for detecting swing position 10 is transmitted to the means for calculating distance 17.

The beam receptor 20 comprises a light receiving lens 11, a light receiving element 12, and a means 23 for amplifying the received light signal, which is transmitted to the means for operating distance 17.

The means for calculating distance 17 uses a method of calculating the distance from the object directly based on the following Formula using a delay time between a time of emitting light and a time of receiving light.

$$D = C*(T2-T1)/2, \quad \text{Formula 1}$$

where reference C designates a light speed of $3*10^8$ m/s;

reference T2 designates the time of emitting light; and reference T1 designates the time of receiving light, wherein because the laser beam goes forward and backward, the distance from the object becomes ½.

In the following, a method of swinging is described. Because there is a predetermined gap between the core 7 and the permanent magnet 6, it is possible to generate a magnetic force in proportion to a current applied to the coil. For example, when a current is supplied in one direction of the coil and the core is excited to be the north pole, the core attracts the south pole of the permanent magnet and repulses the north pole, whereby the permanent magnet 6 receives a force of rotation around the shaft. Because an angle of rotation is in proportional to the coil current, it is possible to control the swing angle by the direction and the magnitude of the coil current.

The element for detecting swing position 10 is, for example, an element for detecting the magnetic flux density of permanent magnet 6. By detecting the magnetic flux density, it is possible to calculate the swing angle of the second mirror 4 and the current to be applied to the coil 8 in order to rotate the second mirror 4 at a predetermined swing angle. As for the element for detecting magnetism 10, for example, a Hall element is used, wherein the element shows a predetermined voltage when the coil is not applied with electricity; the voltage increases as the permanent magnet becomes closer; and the detected voltage decreases as the permanent magnet is apart from the element 10. In other words, the detected voltage has a proportional relationship to the swing angle. The means for controlling swing 16 operates the swing angle from this detected voltage, calculates the coil current for obtaining the predetermined swing angle; and supplies it to the coil 8. In addition, it can transmit the swing angle to the means for calculating distance 17 and inform a direction of measuring at the time.

Figure 3:
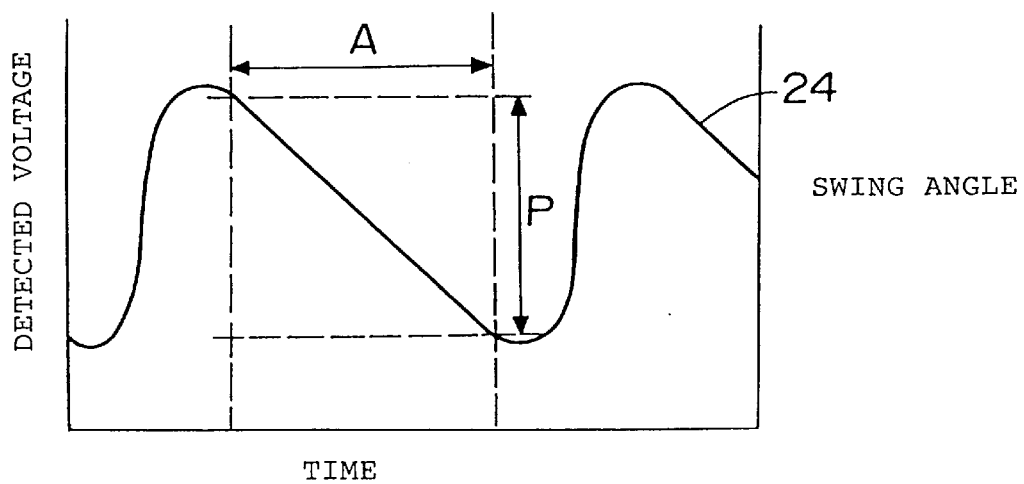
FIG. 3 is a diagram for showing a change of detected voltage of swing position and a change of swing angle according to Example 1.

In FIG. 3, a change of that detected voltage is shown, wherein the abscissa axis is time and the ordinate axis is the detected voltage and corresponds to the swing angle. The second mirror 4 is successively swing by the permanent magnet 6 and an electric current passing through the coil 8. In a time range A, the swing angle changes linearly, while which the distance is measured. The laser beam emitting element 1 continues emission regularly and the element for receiving light 12 receives light, whereby the distance from the object is calculated. The means for controlling swing 16 controls the current of the coil 8 so that the range of detected voltage and the range of swing angle P are maintained to a predetermined extent. Although, in FIG. 3, the distance is measured for only one direction, it is possible to measure the distance by providing linear portions in both ways of going forth and back of the swing motion.

Figure 4:
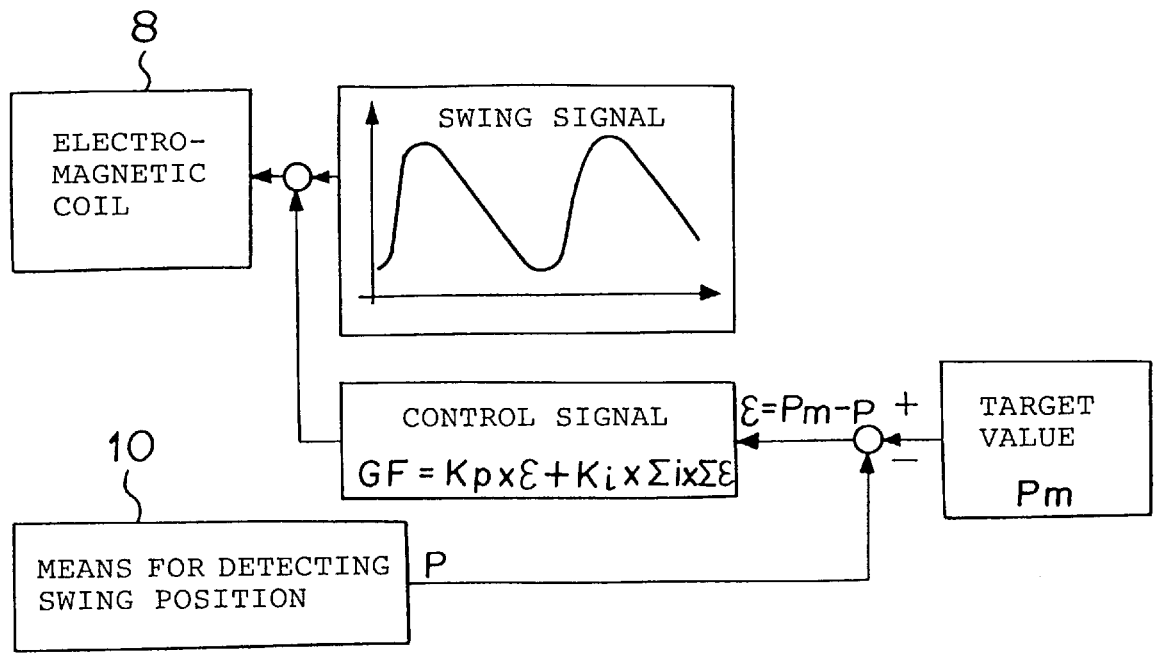
FIG. 4 is a block chart for explaining a feedback control in the means for controlling swing motion according to Example 1.

A detailed method of controlling swing is described with reference to FIG. 4. The control signal is operated by the following formula using a substraction between the detected signal p obtained from the means for detecting swing position 10 and a target value Pm.

$$\epsilon = Pm - P \quad \text{Formula 2}$$

The control signal GF is obtained from the following formula.

$$GF = Kp*\epsilon + Ki*\Sigma\epsilon, \quad \text{Formula 3}$$

where a term Kp is a constant in a term of proportion and Ki is a constant in a term of integration.

The control signal GF designates a gain, by which the coil current is determined in association with a waveform of the swing signal 24. The measurement of distance is conducted under, for example, an A value of 100 ms and Pm of about 100 mrad. In other words, the current for controlling the electromagnetic coil is determined by the waveform and the deviation, and in order to control the predetermined swing, a feedback deviation between a swing signal which can assure a predetermined waveform and the control signal which changes moment by moment are further added. Accordingly, the swing control can be done by operating only the control signal representing the term of deviation, wherein the method of controlling is simplified.

As mentioned above, the control of swinging the scanning mirror is based on the swing signal and the control signal, wherein a waveform of the swing signal can arbitrarily be formed as a predetermined signal and a feedback of only the control signal is used to attain the control. As for a signal for the feedback control, the swing angle of the mirror can be detected by a Hall element without any contact and at a low cost. Thus the method of controlling can be simplified and the accuracy and the performance of controlling can be improved. Further, although the target value is the requisite range of swing angle Pm in FIG. 4, in a case that there is enough time for controlling, it is also possible to change the target value moment by moment based on the detected value from the means for detecting swing position 10 to finally control the Pm.

EXAMPLE 2

Example of the present invention is described with reference to FIG. 2. A means for detecting temperature 21 is provided in the vicinity of the scanning portion 19, and a means for correcting temperature, which corrects the controlled variable using a detected temperature, is integrated into the means for controlling swing 16. When the temperature becomes high, changes occur such that large resistance of a coil results in a small current in the coil and further in a small swing angle; reduced magnetic force of the magnet results in a small swing angle; and a low voltage of detecting position results in a small swing angle. Accordingly, an influence of the temperature is large and the controlled variable is apt to increase because the deviation $\epsilon$ is larger than that without the influence of temperature in the feedback control. Therefore, the means for correcting temperature is to correct the controlled variable so that the increment of controlled variable along with the increment of temperature is restricted. Specifically, the correction can be achieved by changing the constants Kp and Ki for calculating a target value Pm and the controlled variable GF.

EXAMPLE 3

Figure 5:
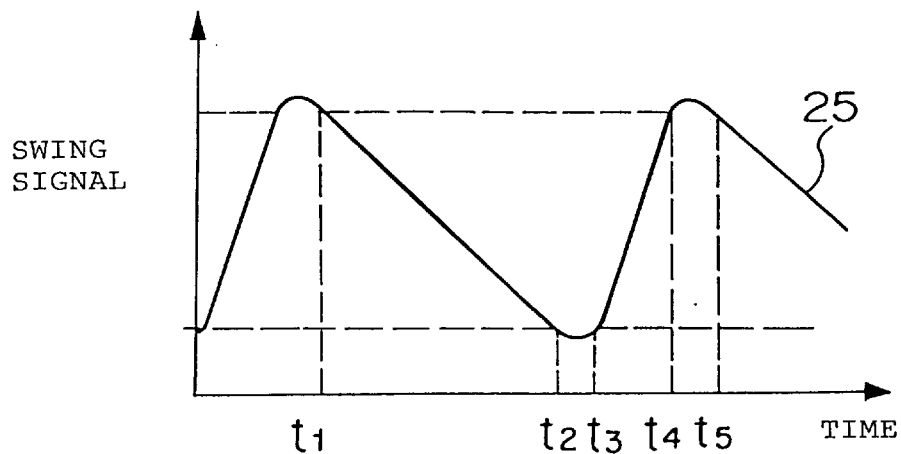
FIG. 5 is a diagram for showing a change of a swing signal according to Example 3.
Figure 6:
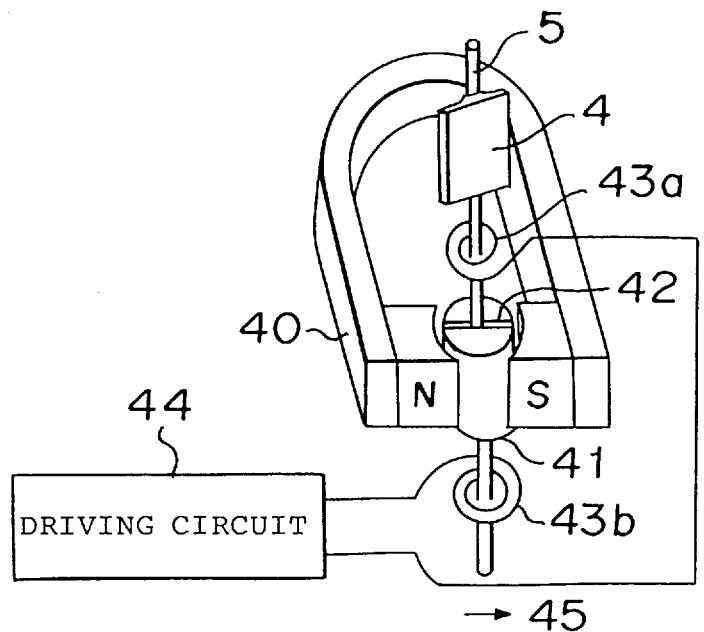
FIG. 6 is a schematical view for showing a structure of the conventional distance measuring device.
Figure 7:
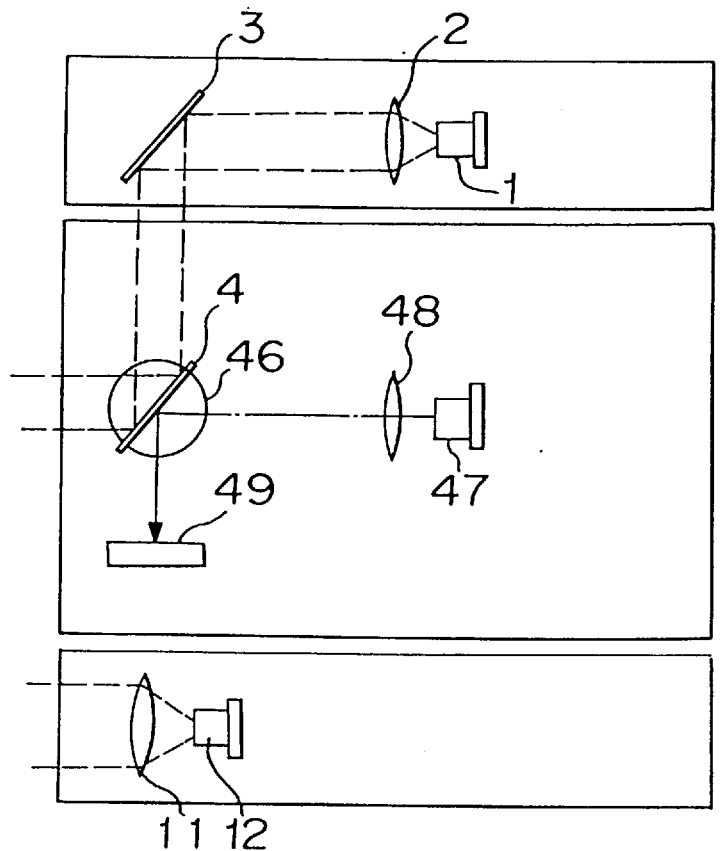
FIG. 7 is a schematical view for showing another structure of the conventional distance measuring device.

In the next, Example 3 is described. A swing signal 25 included in a means for controlling swing 16 is formed such that a portion is linear and the other portions are gentle curves as shown in FIG. 5. The straight line is between a time T1 and a time T2, wherein a mirror 4 is swung at a constant angle speed. A laser beam is also emitted for measuring a distance. There is an effect of simplifying a control when this linearity is used because the laser beam can be emitted in a predetermined period and an orientation of an object can be obtained by a time of emitting light and a time of receiving light. Between a time T3 and a time T4, the signal shows a shape of, for example, a sinusoidal wave wherein the moved mirror is returned to an initial position quickly and a distance measurement is not conducted. Further, the sinusoidal wave has an effect that the signal can be outputted at a predetermined frequency. In a time between T2 and T3 and a time between T4 and T5, the linear portion and the sinusoidal wave portion are connected smoothly and, for example, a second order curve is provided. In the vicinity of the curve, there is a period of changing a scanning direction of the mirror 4, wherein such a curve has an effect of restricting hunting of the mirror 4.

EXAMPLE 4

Example 4 is described in detail. When starting a control of swing, it can be controlled such that the swing angle is started from a small value at an initial time and made to be gradually closer to the waveform shown in FIG. 3, without applying a target signal for controlling swing to the coil 8 at once. With reference to FIG. 4, it means that GF of the control signal is gradually increased. Accordingly, there are effects that a starting of swing is easy and a time required for stabilizing the swing motion can be shortened. By this, the measurement of the distance can be started earlier.

EXAMPLE 5

Example 5 of the present invention is described in detail. When a swing control is started, an open control is performed irrespective of a swing position and a feedback control is performed after the control is stabilized as shown in FIG. 4. In other words, the feedback control shown in FIG. 4 is not performed at the beginning of the swing control. In such an open control, the control is started from, for example, the controlled variable GF having a constant value; a control using a term of proportion only when a deviation $\epsilon$ becomes small, namely, when the swing is stabilized; and a feedback control considering a term of integration is performed when the control is further stabilized. Accordingly, there is an effect that a time from the starting of swing motion and to a state of stable feedback control can be shortened.

EXAMPLE 6

Example 6 of the present invention is described in detail. During a swing control, controlled variables at the time of stabilized feedback control, in Example 4 GF, $\epsilon$ or $\Sigma\epsilon$, are memorized and these memorized controlled variables are used as initial values when the swing motion is started again. Accordingly, it is possible to shorten a time from the starting of swing and a state of a stable feedback control. Further, several kinds of such controlled variables can be memorized with respect to temperature.

The first advantage of the present invention is that what is to be controlled becomes simple and a controlling performance can be improved by a simple feedback control using only a term of deviation concerning a swing position because a scanning portion for scanning laser beam comprises a swingable mirror, a permanent magnet which swings along with the mirror, an electromagnetic coil disposed oppositely to the permanent magnet, a means for detecting swing position for detecting a swing angle of said mirror, and a means for controlling swing motion for controlling said electromagnetic coil so that the detected swing position becomes a predetermined position, wherein said means for controlling swing motion is constructed such that said electromagnetic coil is controlled using a swing signal formed in a predetermined waveform and a signal for controlling swing motion determined by a control signal formed by a controlled variable, which is obtained by operating a deviation between said predetermined position of the mirror and a detected position in order to control said electromagnetic coil.

The second advantage of the present invention is that a stable swing motion is obtainable without influence of a temperature because a distance measuring device has a means for detecting temperature which is provided in the vicinity of a scanning portion and a means for correcting temperature which is integrated into a means for controlling swing motion and corrects a controlled variable depending on a detected temperature.

The third advantage of the present invention is that a periodical timing of emission can be set; a means for emitting light can be simplified; and a direction of an object can easily be judged because a waveform of swing signal has a linear portion at least during a measurement of distance.

The fourth advantage of the present invention is that a hunting of a swingable mirror can be restricted and a high speed swing motion is obtainable because in a waveform of swing signal, a point of changing a swing direction and the vicinity thereof are formed by a gentle curve. See, for example, the portions of curve 25 in FIG. 5 between times t2 and t3, and between times t4 and t5.

The fifth advantage of the present invention is that a time required for stabilizing swing motion can be shortened because a means for controlling swing motion is so constructed that when a swing control is started, the control is gradually increased to reach a predetermined signal for controlling swing.

The sixth advantage of the present invention is that a time required for stabilizing a swing control can be shortened because the control is performed regardless of a swing position when a swing control is started and a predetermined feedback control is performed when the control is stabilized.

The seventh advantage of the present invention is that a time required for stabilizing a swing control can be shortened because a controlled variable used while a swing control is stabilized is memorized and this controlled variable is used as an initial value when the swing control is started again.

Obviously, numerous modifications and variations of the present invention are possible in light of the above teachings. It is therefore to be understood that within the scope of the appended claims, the invention may be practiced otherwise than as specifically described herein.

What is claimed is:

1. A distance measuring device comprising:

a beam emitter for emitting a laser beam, a means for scanning the laser beam by swinging a mirror through a predetermined angular range, a light receptor for receiving the beam reflected by an object, and a means for calculating a distance from the object based on a propagation delay time between a time of emitting the laser beam and a time of receiving the reflected beam, wherein said scanning means comprises a swingable mirror, a permanent magnet swingable along with the mirror, an electromagnetic coil disposed opposite the permanent magnet, a means for detecting swing position which detects a swing angle of said swingable mirror, and a means for controlling swing motion which controls said electromagnetic coil so that a detected swing position becomes a predetermined position, and the means for controlling swing motion is constructed such that said electromagnetic coil is controlled by a signal for controlling swing motion determined by a swing signal formed in a predetermined waveform, and by a control signal formed by a controlled variable calculated from a deviation between said predetermined position of the swingable mirror and the detected swing position.

2. A distance measuring device according to claim 1, further comprising:
  a means for detecting temperature provided in the vicinity of the scanning means, and
  a means for correcting temperature which is integrated into the means for controlling swing motion and corrects the controlled variable depending on the detected temperature.

3. A distance measuring device according to claim 2, wherein the swing signal in the means for controlling swing motion has a waveform including a linear portion (A) at least while the distance is measured.

4. A distance measuring device according to claim 3, wherein
  a point of changing a direction of swing motion and a vicinity thereof define a curve in a waveform formed by the swing signal.

5. A distance measuring device according to claim 3, wherein
  the signal for controlling swing motion, which controls the electromagnetic coil when a swing control is started in the means for controlling swing motion, is formed to gradually increase to the value of a predetermined signal for controlling swing.

6. A distance measuring device according to claim 3, wherein
  the means for controlling swing motion is initially controlled based on a provisional value irrespective of the detected swing position of the mirror at the beginning of swing control, and is returned to a predetermined control using the detected swing position after the control is stabilized.

7. A distance measuring device according to claim 2, wherein
  a point of changing a direction of swing motion and a vicinity thereof define a curve in a waveform formed by the swing signal.

8. A distance measuring device according to claim 7, wherein
  the signal for controlling swing motion, which controls the electromagnetic coil when a swing control is started in the means for controlling swing motion, is formed to gradually increase to the value of a predetermined signal for controlling swing.

9. A distance measuring device according to claim 2, wherein
  the signal for controlling swing motion, which controls the electromagnetic coil when a swing control is started in the means for controlling swing motion, is formed to gradually increase to the value of a predetermined signal for controlling swing.

10. A distance measuring device according to claim 2, wherein
  the means for controlling swing motion is initially controlled based on a provisional value irrespective of the detected swing position of the mirror at the beginning of swing control, and is returned to a predetermined control using the detected swing position after the control is stabilized.

11. A distance measuring device according to claim 1, wherein the swing signal in the means for controlling swing motion has a waveform including a linear portion (A) at least while the distance is measured.

12. A distance measuring device according to claim 11, wherein
  a point of changing a direction of swing motion and a vicinity thereof define a curve in a waveform formed by the swing signal.

13. A distance measuring device according to claim 12, wherein
  the signal for controlling swing motion, which controls the electromagnetic coil when a swing control is started in the means for controlling swing motion, is formed to gradually increase to the value of a predetermined signal for controlling swing.

14. A distance measuring device according to claim 11, wherein
  the signal for controlling swing motion, which controls the electromagnetic coil when a swing control is started in the means for controlling swing motion, is formed to gradually increase to the value of a predetermined signal for controlling swing.

15. A distance measuring device according to claim 11, wherein
  the means for controlling swing motion is initially controlled based on a provisional value irrespective of the detected swing position of the mirror at the beginning of swing control, and is returned to a predetermined control using the detected swing position after the control is stabilized.

16. A distance measuring device according to claim 1, wherein
  a point of changing a direction of swing motion and a vicinity thereof define a curve in a waveform formed by the swing signal.

17. A distance measuring device according to claim 16, wherein
  the signal for controlling swing motion, which controls the electromagnetic coil when a swing control is started in the means for controlling swing motion, is formed to gradually increase to the value of a predetermined signal for controlling swing.

18. A distance measuring device according to claim 1, wherein
  the signal for controlling swing motion, which controls the electromagnetic coil when a swing control is started in the means for controlling swing motion, is formed to gradually increase to the value of a predetermined signal for controlling swing.

19. A distance measuring device according to claim 1, wherein
  the means for controlling swing motion is initially controlled based on a provisional value irrespective of the detected swing position of the mirror at the beginning of swing control, and is returned to a predetermined control using the detected swing position after the control is stabilized.

20. A distance measuring device according to claim 1, wherein
  the means for controlling swing motion has a means for memorizing a controlled variable during a stable swing control, and the swing motion is started using this memorized controlled variable as an initial value when the swing motion is started again.

* * * * *